Figure 1:
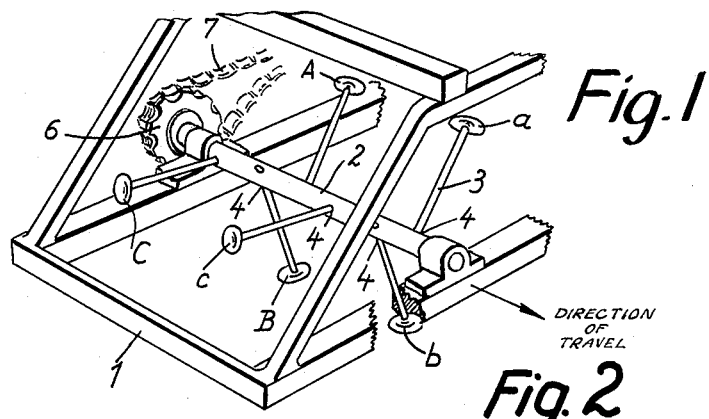

Oct. 3, 1961  IB STAMPE RASMUSSEN  3,002,572
ADJUSTABLE BLOCKING MACHINE
Filed May 25, 1956

INVENTOR.
Ib Stampe Rasmussen
BY
Mason, Fenwick & Lawrence
Attorneys

United States Patent Office 3,002,572
Patented Oct. 3, 1961

3,002,572
ADJUSTABLE BLOCKING MACHINE
Ib Stampe Rasmussen, Industrivej 7, Glostrup, Denmark
Filed May 25, 1956, Ser. No. 587,428
Claims priority, application Denmark May 28, 1955
2 Claims. (Cl. 172—109)

This invention relates to a blocking machine for blocking beets or similar crops sown in rows, the said machine being of the kind having working members rotating transversely of the plant rows and mounted on arms which radiate from at least one shaft disposed longitudinally of the direction of travel of the machine and horizontally above the plant rows, the said shaft being in driven connection with the travelling wheels or power take-off of a vehicle.

It is known in blocking machines of the aforesaid kind to place the working members on radial, circularly arranged arms in one or more axially staggered planes of the shaft, subsequently adapting the rotational speed of the said shaft in relation to the travelling speed of the vehicle by means of exchangeable speed reduction pinions, whereby the number of, and the spaces between, the blocks in the row are determined. However, the replacement of such pinions is a job that takes much time, requires attention to details and a certain expert skill and e.g. special tools. In addition, such a replacement has often to be made in the field under primitive conditions, which to some extent renders the replacement of the pinions difficult. A further drawback of circularly arranged working members is that the distance between the individual arms is reduced with the number of working members thus provided in the circle and if the distance is small the members will not be self-cleaning, so that plants, weeds and, for instance, stones are liable to be retained between adjacent working members, and this will disturb the accuracy of the blocking operation. The arrangement of the many circularly disposed members in the same radial plane involves furthermore constructional difficulties, since the shaft is either weakened by many radial bores in the same plane, or it has to be reinforced by retaining clamps or blocks to which the arms are attached. This will increase the weight of the shaft and complicate the design.

It is the object of the invention to devise the construction of a blocking machine of the aforesaid kind in which the aforesaid drawbacks are eliminated. An essential feature of a blocking machine according to the invention is that the arms of the working members are similar in shape to each other and attached to the shaft at points which are uniformly, angularly staggered along the surface of the shaft, conforming to a helix with a pitch equal to the distance travelled by the vehicle during one revolution of the shaft.

It is an additional object of this invention to provide a blocking machine having a unidirectionally rotating shaft that will provide the effect of a duodirectionally rotating shaft.

Briefly, this invention is directed to a blocking machine which need not have a reversely rotating longitudinal shaft to obtain various patterns of blocking. This is achieved by providing through going holes or bores the axes of which are disposed on the shaft in a rotated relationship to each other, each bore providing a hole for each of two different and forwardly directed sets of holes which form two different and forwardly directed sets of attaching means. By selecting progressive adjacent attaching means of alternate sets, a third and reversely directed set of attaching means is possible. This third set has an effect similar to that of either of the forwardly directed sets if rotated in a reverse direction.

The advantage obtained is that the distance between adjacent working members may be made sufficiently large, simply by increasing the working width of the shaft, which gives less tendency to accumulation of plants, weeds and waste matter and insures improved and freer ejection of foreign bodies such as stones, and the working members will thus be fully self-cleaning.

Figure 2:
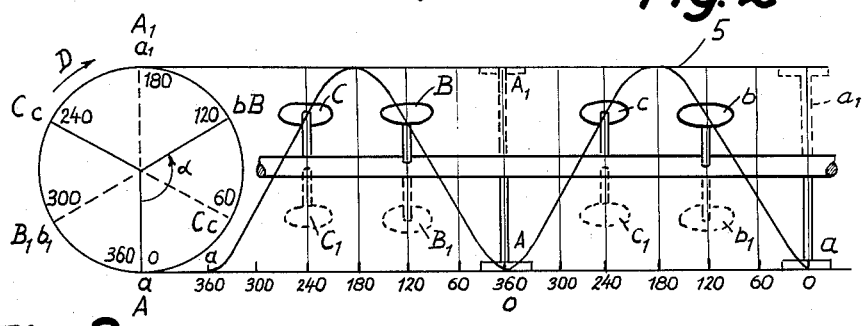

In one embodiment of the blocking machine according to the invention the arms are attached in two equal sets of attaching means shown, for example, as radially disposed through going holes or individual attaching means which permit formation of two forwardly directed helices of attachments shown in FIGURE 2, as C, B, A, $c$, $b$, $a$ and in phantom lines $C_1$, $B_1$, $A_1$, $c_1$, $b_1$ and $a_1$. The axes of the holes are located in such manner that the axes of successive holes are staggered by an angle equal to the division of 360° by the number of holes in a set disposed in one revolution about the shaft.

This affords possibility of providing a large number of cutting or blocking patterns, simply by varying the number of arms used and their location in the holes, and the combinations can be provided without changing the driving connection between the shaft and the travelling wheels or power take-off of the vehicle.

Figure 3:
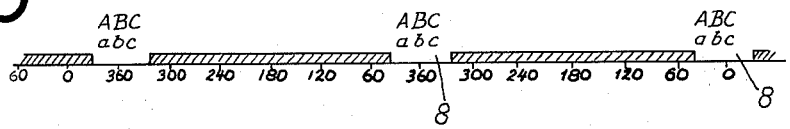
Figure 4:
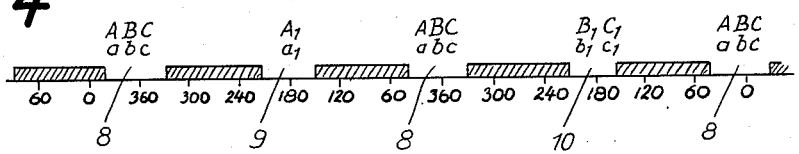
Figure 2A:
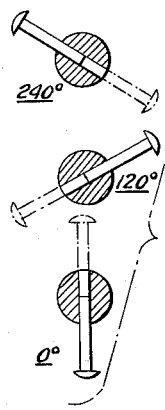

The invention will now be further described with reference to the drawing, in which FIGURE 1 is a perspective view of a part of a blocking machine according to the invention, FIGURE 2 is a diagrammatic view of a shaft in a blocking machine according to the invention, FIGURE 2a is a cross-sectional view of the shaft taken as shown along lines 240°, 120° and 0° in FIGURE 2, showing the individual attachment means in the form of through going holes and the working members in position, as shown by the solid lines, and by the phantom lines the possible positions of other working members, and FIGURES 3 and 4 show diagrammatically a row of beets or similar crops standing in rows and with blocks and spaced intervals as produced by arranging the working members in definite positions.

In FIGURE 1, a frame 1 constitutes a part of a blocking machine according to the invention and 2 is a shaft mounted in the frame 1 which may be attached in known manner to a vehicle (not shown), for example, a tractor or another self-propelled or drawn vehicle. The shaft 2 rests with its longitudinal axis in the direction of travel of the vehicle and horizontally above the plant rows consisting of beets or similar crops (not shown), and the shaft is in driven connection with the travelling wheels or power take-off of the vehicle. Arms 3 are provided with working members $a$, $b$, $c$, A.B.C., and the working members are arranged along the shaft at attachment points 4, which are uniformly, angularly staggered along the surface of the shaft 2 and conforming to a helix 5 which, as shown in FIGURE 2, has a pitch equal to the distance travelled by the vehicle during one revolution of the shaft 2, the driven connection with the travelling wheels or the power takeoff of the vehicle being established through sprocket 6 and a chain 7. It will be appreciated that when the shaft 2 rotates, the working members $a$ . . . C are at various times passed transversely through the plant rows, and since the said members are provided with a sharpened edge they will cut spaces or intervals in the said rows by their through-going movement.

The arms 3 may be attached in throughgoing holes 4 which are at right angles to the axis of the shaft 2, and the axes of the holes 4 may then be so disposed that the axes of successive holes are equally staggered by an angle $\alpha$. In the solid line embodiment of the invention shown diagrammatically in FIGURE 2 only one set of attaching means is used and the said arms are staggered along the helix 5 by an angle of ⅓ of a full revolution, as indicated to the left in the diagram (FIGURE 2). Each of the said through going holes or attaching means 4 provides two attaching means for attaching one arm 3 on one side of the shaft and another arm 3 on the opposite side of the shaft. FIGURE 3 shows that if all the members $a$, $b$, $c$, A.B.C. are disposed as shown in the diagram in FIGURE 2 by solid drawn lines, all of the six working members will pass through the tracks 8 which are located a distance of 360 degrees apart, that is, a distance corresponding to one revolution of the shaft 2. If the working members $a_1$, $b_1$, $c_1$ and $A_1$, $B_1$, $C_1$ are added to the positions indicated by dotted lines in FIGURE 2, it will be evident from FIGURE 2 that the said members will produce new tracks, 9 and 10, respectively, located midway between the tracks 8 as indicated in FIGURE 4.

It will be obvious that by selecting a suitable number of working members and mounting these at suitable points of the shaft, it is possible to provide a large variety of combinations of blocks and intervals of different widths, and a series of examples of such combinations is shown in each of the figures indicating which members produce the tracks shown. In such examples being shown, however, the blocks are of the same length throughout the plant row. It will be obvious that this composition of intervals and blocks will be found best applicable in practice.

Since the exchange and the re-adjustment of the working members $a$ . . . C may take place by simply screwing the arms 3 of these into the holes 4, such readjustment may take place even under highly primitive conditions and with the use of simple tools, without requiring any expert skill whatever, and this embodies a substantial simplification in the use of the blocking machine.

To illustrate the operation of this invention, consider FIGURE 2, wherein the two forwardly directed helices of attaching means are shown with the means attached, the first set being indicated in solid lines at C, B, A, $c$, $b$, $a$, the second set by the phantom lines at $C_1$, $B_1$, $A_1$ $c_1$, $b_1$, $a_1$. Variations of the patterns may be achieved as desired and shown in FIGURES 3 and 4. The reverse helix of attaching means may be achieved by selecting the progressive adjacent attaching means of alternate sets (ex. the first and second sets above). The result from such a selection would be according to FIGURE 2, C, $B_1$, A, $c_1$, $b$, $a_1$. Such a selection has the effect of using a forward helix and reversing the direction of rotation of the shaft. Thus, the shaft may be unidirectional.

What I claim and desire to secure by Letters Patent is:

1. A row crop blocking machine of the type having at least one shaft horizontally disposed longitudinally of the direction of travel of the machine with radial arms having one end of each connected to said shaft and earth working members at their other ends and the shaft being rotatably driven, the improvement comprising, at least two sets of attaching means detachably connecting said arms to the shaft, each set of said attaching means being a plurality of individual attaching means helically arranged about said shaft, the sets of attaching means being oriented with respect to each other at equal angles around the shaft, the respective individual attaching means of the sets being equally spaced longitudinally of the shaft, and means to rotate the shaft one revolution each time the machine has traveled a distance equal to the sum of the longitudinal spacings of said individual attaching means in a helix of a set of attaching means, the construction and arrangement of the attaching means being such that the sets of attaching means form forwardly directed helically arranged attaching means and that progressive adjacent attaching means of alternate sets forms a reversely directed set of helically arranged attaching means whereby the effect of two rotating directions of the shaft are obtained from a uni-directionally rotating shaft.

2. A row crop blocking machine of the type having at least one shaft horizontally disposed longitudinally of the direction of travel of the machine with radial arms having one end of each connected to said shaft and earth working members at their other ends and the shaft being rotatably driven, the improvement comprising, two sets of attaching means detachably connecting said one ends of said radial arms to the shaft, each set of said attaching means being a plurality of individual attaching means helically arranged about the shaft and having a pitch equal to the forward movement of the machine during one rotation of the shaft, the individual attaching means of each set being spaced equidistant longitudinally of the shaft and at equal angles around the shaft, the individual attaching means of the sets of attaching means being similar in number similarly spaced longitudinally of the shaft, and arranged at similar angles around the shaft, the individual attaching means of one set of attaching means being 180° out of phase with respect to companion individual attaching means of the other set of attaching means, so that projected lines connecting the individual attaching means of each set of attaching means will describe a pair of equal intertwined helicoids, and said helical arrangement of said plurality of attaching means being two complete revolutions about the shaft, the construction and arrangement of the attaching means being such that the sets of attaching means form forwardly directed helically arranged attaching means and that progressive adjacent attaching means of alternate sets forms a reversely directed set of helically arranged attaching means whereby the effect of two rotating directions of the shaft are obtained from a uni-directionally rotating shaft.

References Cited in the file of this patent

UNITED STATES PATENTS

| | | |
|---|---|---|
| 66,128 | Chambers et al. | June 25, 1867 |
| 158,663 | Wood | Jan. 12, 1875 |
| 233,546 | Rawls | Oct. 19, 1880 |
| 407,512 | Clark | July 23, 1889 |
| 692,585 | Adams | Feb. 4, 1902 |

FOREIGN PATENTS

| | | |
|---|---|---|
| 776,086 | France | Jan. 16, 1935 |